United States Patent
Pallath et al.

(10) Patent No.: US 10,310,846 B2
(45) Date of Patent: Jun. 4, 2019

(54) AUTOMATED APPROACH FOR INTEGRATING AUTOMATED FUNCTION LIBRARY FUNCTIONS AND ALGORITHMS IN PREDICTIVE ANALYTICS

(71) Applicants: Paul Pallath, Naas (IE); Ronan O'Connell, Clane (IE); Robbie O'Brien, Dublin (IE); Girish Kalasa Ganesh Pai, Dublin (IE); Jayanta Roy, Adamstown (IE); Satinder Singh, Lucan (IE)

(72) Inventors: Paul Pallath, Naas (IE); Ronan O'Connell, Clane (IE); Robbie O'Brien, Dublin (IE); Girish Kalasa Ganesh Pai, Dublin (IE); Jayanta Roy, Adamstown (IE); Satinder Singh, Lucan (IE)

(73) Assignee: Business Objects Software Ltd., Dublin (IE)

( * ) Notice: Subject to any disclaimer, the term of this patent is extended or adjusted under 35 U.S.C. 154(b) by 17 days.

(21) Appl. No.: 14/662,502

(22) Filed: Mar. 19, 2015

(65) Prior Publication Data

US 2016/0170742 A1    Jun. 16, 2016

Related U.S. Application Data

(60) Provisional application No. 62/092,002, filed on Dec. 15, 2014.

(51) Int. Cl.
*G06F 8/70* (2018.01)
*G06N 5/04* (2006.01)
(Continued)

(52) U.S. Cl.
CPC .............. *G06F 8/70* (2013.01); *G06F 8/33* (2013.01); *G06F 8/34* (2013.01); *G06F 8/36* (2013.01); *G06N 5/04* (2013.01); *G06N 20/00* (2019.01)

(58) Field of Classification Search
CPC ..... G06F 8/70; G06F 8/33; G06F 8/34; G06F 8/36; G06N 5/04; G06N 99/005; G06N 20/00
(Continued)

(56) References Cited

U.S. PATENT DOCUMENTS 6,493,704 B1    12/2002 Hichwa et al.
8,250,009 B1 *   8/2012 Breckenridge ........ G06N 20/00
                                                        706/14
(Continued)

OTHER PUBLICATIONS

Das et al, Massively parallel in-database predictions using PMML, Proceedings of the 2011 workshop on Predictive markup language modeling, pp. 22-27, ACM New York, NY, USA.*
(Continued)

*Primary Examiner* — Ziaul A Chowdhury
*Assistant Examiner* — Zengpu Wei
(74) *Attorney, Agent, or Firm* — Fish & Richardson P.C.

(57) ABSTRACT

The disclosure generally describes computer-implemented methods, software, and systems, including a method for generating executable components. One method includes identifying a user request to create a new function based pre-existing algorithms, the new function to be used in an application used by a user; providing a set of available algorithms from an algorithm library; receiving a selection by a user of an algorithm from the available algorithms; providing a set of available parameters associated with the selected algorithm; receiving an election by the user of one or more parameters from the set of available parameters; generating an executable component in response to receiv- (Continued)

ing the selection of the algorithm and the election of the one or more parameters, the executable component performing the selected algorithm using at least the elected one or more parameters; and storing the executable component for subsequent execution in response to the requested new function.

20 Claims, 8 Drawing Sheets

(51) Int. Cl.
*G06N 20/00* (2019.01)
*G06F 8/33* (2018.01)
*G06F 8/34* (2018.01)
*G06F 8/36* (2018.01)

(58) Field of Classification Search
USPC .......................................................... 717/120
See application file for complete search history.

(56) References Cited

U.S. PATENT DOCUMENTS

| | | | | |
|---|---|---|---|---|
| 8,311,967 | B1* | 11/2012 | Lin | G06N 20/00 706/45 |
| 8,417,715 | B1* | 4/2013 | Bruckhaus | G06F 17/30994 705/26.1 |
| 8,438,122 | B1* | 5/2013 | Mann | G06N 20/00 706/12 |
| 8,443,013 | B1* | 5/2013 | Lin | G06Q 10/04 707/810 |
| 8,473,431 | B1* | 6/2013 | Mann | G06N 5/04 706/12 |
| 8,595,154 | B2* | 11/2013 | Breckenridge | G06N 20/00 706/12 |
| 8,843,427 | B1* | 9/2014 | Lin | G06N 20/00 706/45 |
| 2004/0249779 | A1* | 12/2004 | Nauck | G05B 13/0275 706/47 |
| 2010/0179930 | A1* | 7/2010 | Teller | G06N 20/00 706/12 |
| 2014/0046879 | A1* | 2/2014 | Maclennan | G06N 20/00 706/12 |
| 2014/0136452 | A1* | 5/2014 | Wellman | G06N 20/00 706/12 |
| 2014/0180982 | A1* | 6/2014 | Murphy | G06N 5/04 706/14 |
| 2014/0188845 | A1 | 7/2014 | Ah-Soon et al. | |
| 2014/0208293 | A1 | 7/2014 | Pusz et al. | |
| 2014/0282489 | A1* | 9/2014 | Andrabi | G06Q 10/06 717/174 |
| 2014/0289009 | A1* | 9/2014 | Campbell | G06Q 30/0201 705/7.31 |
| 2014/0303953 | A1* | 10/2014 | Bates | G06Q 30/02 703/13 |
| 2015/0100528 | A1* | 4/2015 | Danson | G06N 5/04 706/21 |

OTHER PUBLICATIONS

Ayhan et al, "Predictive Analytics with Surveillance Big Data", [Online], 2012, pp. 81-90, [Retrieved from internet on Mar. 18, 2019], <http://delivery.acm.org/10.1145/2450000/2447491/p81-ayhan.pdf> (Year: 2012).*

McCue, "Data Mining and Predictive Analytics in Public Safety and Security", [Online], 2006, pp. 12-18, [Retrieved from internet on Mar. 18, 2019], <https://ieeexplore.ieee.org/stamp/stamp.jsp?tp=&arnumber=1683737> (Year: 2006).*

Shmueli et al, "Predictive Analytics in Information Systems Research", [Online], 2011, pp. 553-572, [Retrieved from internet on Mar. 18, 2019], <https://patents.google.com/scholar/2221024531527814904?q=predictive+analytics&scholar&oq=predictive+analytics> (Year: 2011).*

EPO Communication and European Search Report dated Apr. 11, 2016 in related EPO Application No. 15003423.9-1954; 9 pages.

EPO Communication and Office Action dated Mar. 15, 2017 in related EPO Application No. 15003423.9-1954; 8 pages.

Bruni P. et al. "DB2 Stored Procedure Builder", DB2 UDB for OS/390 Management Tools Package, May 1, 2000, pp. 215-271, XP002424687.

* cited by examiner

AUTOMATED APPROACH FOR INTEGRATING AUTOMATED FUNCTION LIBRARY FUNCTIONS AND ALGORITHMS IN PREDICTIVE ANALYTICS

CROSS-REFERENCE TO RELATED APPLICATION

This application claims priority to U.S. Provisional Application No. 62/092,002, filed on Dec. 15, 2014. The disclosure of the prior application is considered part of and is incorporated by reference in the disclosure of this application.

BACKGROUND

The present disclosure relates to generating executable components.

Analytical applications can be developed and used in order to analyze data, such as to determine trends and/or make predictions. For example, in order to present specialized information that a customer needs, such as to make predictions based on historical data, developers may have to write additional code or provide other services. Analytical applications can require a high degree of extensibility and flexibility for development and customer adaptation.

SUMMARY

The disclosure generally describes computer-implemented methods, software, and systems for generating executable components. For example, a user request is identified to create a new function based on at least one of pre-existing algorithms, the new function to be used in an application. A set of available algorithms from an algorithm library is provided for presentation via an interface. A selection of an algorithm from the available algorithms is received for initial creation of the new function. A set of available parameters associated with the selected algorithm is provided for presentation in the interface. An election by the user is received of one or more parameters from the set of available parameters to be used in the new function. An executable component is generated in response to receiving the selection of the algorithm and the election of the one or more parameters, the executable component performing the selected algorithm using at least the elected one or more parameters. The executable component is stored for subsequent execution in response to the requested new function, the executable component for executing the new function.

The present disclosure relates to computer-implemented methods, software, and systems for generating executable components. One computer-implemented method includes: identifying a user request to create a new function based on at least one of pre-existing algorithms, the new function to be used in an application used by a user; providing, for presentation via an interface, a set of available algorithms from an algorithm library; receiving a selection by a user of an algorithm from the available algorithms for initial creation of the new function; providing, for presentation in the interface, a set of available parameters associated with the selected algorithm; receiving an election by the user of one or more parameters from the set of available parameters to be used in the new function; generating an executable component in response to receiving the selection of the algorithm and the election of the one or more parameters, the executable component performing the selected algorithm using at least the elected one or more parameters; and storing the executable component for subsequent execution in response to the requested new function, the executable component for executing the new function.

Another computer implemented method includes: identifying a request from a user associated with a request for providing additional functionality corresponding to a predictive analytics application; providing an interface to the user including a set of available functions from a library external to the predictive analytics application; receiving a selection of at least one available functions for addition into the predictive analytics application, the selection identifying at least one parameter to be used in the selected function; generating an executable component in response to receiving the selection, the executable component performing the at least one selected function using the at least one identified parameter; and storing the executable component for further execution with the predictive analytics application.

The present disclosure relates to integrating algorithms and functions available in an Automated Function Library (AFL) into predictive analytics. In one instance, the AFL algorithms and functions may be integrated without explicitly packaging the entire library with a predictive analytics application, e.g., as an off-the-shelf offering. One example use of predictive analytics is to predict values in a cell or a column of a spreadsheet using cells and/or columns in the spreadsheet. For example, using predictive analytics, currently available information can be used to make a prediction regarding a future (e.g., next quarter's) profit or loss.

In developing this solution, one challenge is to provide a way for users to input Structured Query Language (SQL) scripts into an application, and have the resultant SQL scripts behave as reusable components in the application, just as the components are written into the application. Specifically, a predictive analytical library (PAL) (e.g., in a particular database platform, or in an in-memory database) can be exposed to the user, allowing the user to call on the library's functions in the application. When exposing SQL to the user at any level, even if the SQL is limited to parameter values, the developer must have security in mind at all times. Exposing a full SQL script to the user can have very dangerous side effects and/or can compromise the system as a whole in the hands of a malicious user. Another challenge is also presented in the artifacts that the user creates in their script. In any given implementation of a PAL function, for example, the user is typically creating a minimum of eight database artifacts. If a means is exposed for users to input any script, for example, then the challenge can include identifying these artifacts and, more importantly, identifying if and when they can be removed.

A number of advanced analytics algorithms can be developed as part of an Automated Function Library (AFL). In some implementations, the AFL can include several libraries such as a Predictive Analytics Library, an Automated Predictive Library, and a Business Function Library. The Predictive Analytics application or other product can surface these algorithms as components in the product for the user to use. If all of the algorithms are shown as available components in the product, for example, then this can be overwhelming to the user, as the user may be interested in only a subset of them. However, there has to be a way for the user to automatically add the algorithms effortlessly. As algorithms are developed over time, the Predictive Analytics application or other product may have to keep catching up with the latest algorithms in AFL, which can be a significant development effort. Another aspect is that it may not be possible or feasible to license each algorithm separately when provided to users.

In some implementations, a solution is presented in which raw SQL is not exposed to the user, but instead, a form-like interface is presented that serves the same purpose. Providing the same power and flexibility without giving the user access to the raw script can require a powerful engine and architecture to interpret, structure, and execute all the possible interpretations. In some implementations, solutions can also provide increased security and garbage collection.

To support this approach, a study was conducted to review the library and identified generic structures that can be simplified into a series of repeating forms. Using this data initially provided by the user, such data can be leveraged at run-time to drive SQL generation. Security can be implemented as the SQL is generated, and logging can be performed on any artifacts, while also handling their lifespan accordingly. Since SQL generation is handled automatically, the generation can be isolated from the rest of the application. This approach can lend itself well to integration that is focused on the inputs and outputs, and not affecting the overall state of the application.

One challenge of this approach is functional correctness. As the SQL is generated at runtime, there may be no way to validate the script at the time the user defines it. This is because, from an SQL implementation point-of-view, the script does not exist yet. One way to address this validation issue is by being thorough and precise in the solution.

Exposing SQL scripts to users is a field that does not always provide a clean solution. The essence of the problem being addressed is that users need a way to leverage the power of their backend systems and applications without having to interact with them directly. This solution provides a cleaner way to expose the SQL script to the user without requiring the user to input any SQL at all. By generalizing the problem and by defining the corresponding solution in a user interface-first initiative, the security and maintainability of whatever SQL the user inputs can be controlled.

In some implementations, this solution can expose SQL to users, e.g., first time SQL users unfamiliar with SQL. This can also provide solutions to one or more of security concerns, garbage collection, integration with applications, and functional correctness.

Restated, the present solution, among other aspects, provides a generic way to automatically get the AFL algorithms into a predictive analytics application, without the algorithms being pre-packaged with the predictive analytics application. Further, the solution enables the user to pick and choose the algorithms to work with, without explicitly flooding the user with loads of algorithms up front which may never be used. Additionally, the solution can allow automatic surfacing of the relevant visualizations for the algorithms that the user intends to get into the predictive analytics product, without the user explicitly creating them.

Using this approach, applications that are created can use a combination of a processor, a single configuration, and some optional application-specific coding. The processor itself can represent a generic analytical application which is dynamically instantiated each time, e.g., through a different configuration that is identified by a key. Extensibility (e.g., that is coding-free) can be achieved through use of the configuration, that is, by changes to the configuration. The configuration process itself can be strongly domain-specific and hence can be supported by tailored modeling tools.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further includes, for a particular parameter that is elected, providing, for display to the user, a parameter attributes associated with the parameter, the parameter attributes including a default value and a data type for the parameter; receiving a value override by the user that replaces the default value; and including the value override in the generated executable component prior to the storing.

In a second aspect, combinable with any of the previous aspects, generating the executable component includes: using a template that includes code for all available parameters associated with the selected algorithm; including code for parameters and values elected by the user; and excluding code for parameters not elected by the user.

In a third aspect, combinable with any of the previous aspects, each algorithm is defined by one or more structured query language (SQL) statements, wherein the SQL statements are hidden from the user, and wherein the executable component includes SQL statements.

In a fourth aspect, combinable with any of the previous aspects, the executable component is compatible with the application and a data set upon which the application operates.

In a fifth aspect, combinable with any of the previous aspects, the executable component comprises a reusable stored procedure.

In a sixth aspect, combinable with any of the previous aspects, the pre-existing algorithms provide predictive analytical analysis.

In a seventh aspect, combinable with any of the previous aspects, the algorithm library is a centralized library.

In an eighth aspect, combinable with any of the previous aspects, each algorithm is associated with a training algorithm, and generating the executable component includes identifying a scoring algorithm associated with the training algorithm and associating the identified scoring algorithm with the executable component.

The subject matter described in this specification can be implemented in particular implementations so as to realize one or more of the following advantages. First, users can add and integrate new algorithms for use in business analytics, model building, e.g., without having to know or understand the underlying SQL that implements the algorithms. Second, algorithm-specific licensing can be supported, e.g., so that licensing can be tracked on a per-user basis. Third, simplified selection and customization of algorithms can facilitate monetization of algorithms. Fourth, users need not write a single line of code. Fifth, algorithms that are presented to users can include default settings that include assumptions as to which parameters and values are to be used. Sixth, users can decide what parameters are to be included in an algorithm, modify values and names of parameters, and decide how the customized components that execute the algorithms are to be used, shared, and distributed.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for processing information. For example, a user can be presented with a catalog of predictive algorithms that expose, for each algorithm, a definition of the algorithm, including the algorithm's parameters and default values. The user can make decisions regarding how the algorithm is going to operate as a function to be used by the user for operating on data. For example, the user can fine tune the algorithm, electing which optional parameters to include or exclude, providing overrides as needed for parameter values and names, and saving the selections. The result is an executable component, e.g., including SQL statements, that is configured to execute the user-customized function.

In some implementations, executable components can be migrated to production systems. For example, models represented by user-customized functions can be incorporated into regular system processes, wherein the flow of information in real time is used in a training model in order to make predictions in the live environment.

Predictive algorithms can use historical data for a particular event of interest to predict the events in the future. The historical data, for example, embeds knowledge associated with the event. When training the predictive algorithms using historical data, for example, the robustness of the model can be visualized using various statistical parameter values and visualizations. This can be done without requiring the user to write additional code for generating statistical signatures and associated visualizations for the algorithms that the user intends to use. Also, when the user creates a component, associated statistical signatures and algorithm-specific visualizations are automatically provided, without any extra effort or code by the user.

One major purpose of any algorithm that is trained using historical data is to deploy the associated trained model in the production environment to generate prediction in real time using new incoming data streams. Selection and incorporation of an algorithm, for example, can also automatically identify and incorporate the corresponding scoring algorithm for the component that the user has created. For example, the scoring function can be configured to understand the training model, which makes it possible for real-time scoring of new incoming data.

Figure 1:
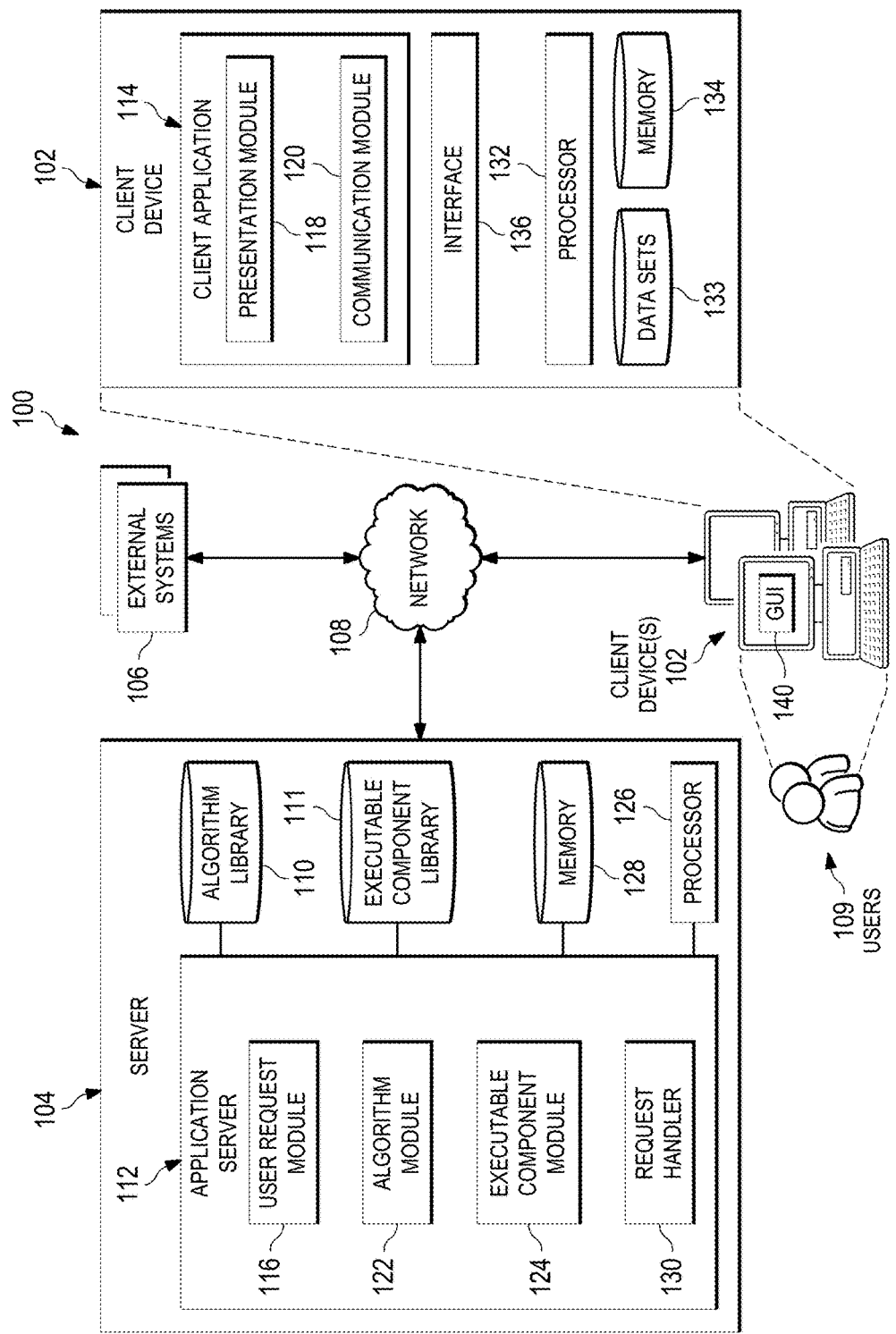
FIG. 1 is a block diagram of an example environment for generating executable components for user-customized functions.

FIG. 1 is a block diagram of an example environment 100 for generating executable components for user-customized functions. Specifically, the illustrated environment 100 includes, or is communicably coupled with, plural client devices 102, a server 104, and one or more external systems 106, connected using a network 108. For example, the environment 100 can be used to present information on the plural client devices 102 using information available from the server 104. One or more users 109, for example, can provide inputs and/or make selections on the client device 102 that affect how the information is presented.

At a high level, the server 104 comprises an electronic computing device operable to collect, store and provide access to information for use by the client device 102. An algorithm library 110, for example, can include plural predefined algorithms that are user-customizable for generating functions for use by the user. For example, the user can select a specific algorithm from the algorithm library 110 and elect specific parameters in the algorithm that are to be used to generate a function. The function can be implemented as an executable component (e.g., containing SQL statements) that the user can use for analyzing a specific one of data sets 133. In some implementations, some or all of the algorithm library 110 and the data sets 133 can reside in external systems 106 or can be local to the server 104 and the client device 102, respectively. Data sets 133 can include data bases, e.g., that are local to the client device 102, or may be distributed to one or more or the client device 102, the server 104, and external systems 106.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

In some implementations, the server 104 includes an application server 112 that performs processing at the server 104 that is needed to support requests for data and user inputs received from the client device 102. For example, the application server 112 can send data to and process requests received from at least one client application 114 at the client device 102.

The application server 112 includes a user request module 116, for example, that can prepare data that is to be presented by a presentation module 118 at the client device 102. For example, the user request module 116 can prepare data for presentation based on user inputs received by a communication module 120. The inputs, for example, can include user inputs for selecting a particular algorithm from the algorithm library 110, election of specific parameters associated with the user-selected algorithm, attributes for the elected parameters, and other inputs. The user request module 116 can also be used by the server 104 for communicating with other systems in a distributed environment, connected to the network 108 (e.g., the client device 102), as well as other systems (not illustrated) communicably coupled to the network 108. Generally, the user request module 116 comprises logic encoded in software and/or hardware in a suitable combination and operable to communicate with the network 108. More specifically, the user request module 116 may comprise software supporting one or more communication protocols associated with communications such that the network 108 or interface's hardware is operable to communicate physical signals within and outside of the illustrated environment 100.

As will be described below, the user request module 116, for example, can identify a user request, received from the client device 102, to create a new function based on at least one of pre-existing algorithms (e.g., from the algorithm library 110). For example, the new function can be used in an application used by the user 109, such as the client application 114. The new function can be in the form of an executable component, e.g., created by an executable component module 124. FIGS. 2-5 below provide example user interface screens associated with user actions that result in the creation of the executable component.

The application server 112 further includes an algorithm module 122 that can access a set of available algorithms from the algorithm library 110. The set of algorithms accessed can depend on inputs received from the client device 102 and can be provided to the client device 102 for presentation to the user, in an interface, using a presentation module 118. When accessing the algorithms, the algorithm module 122 can also look up each algorithm's set of available parameters associated with the selected algorithm, which can also be provided to the client device 102 for presentation to the user in an interface.

The application server 112 further includes the executable component module 124 that can be used to generate an executable component in response to receiving the selection of the algorithm and the election of the one or more parameters. For example, the generated executable component can perform the selected algorithm using at least the elected one or more parameters. The executable component module 124 can also store the executable component (e.g., in an executable component library 111) for subsequent execution in response to the requested new function, the executable component for executing the new function.

The server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the algorithm library 110 and the executable component library 111 (described above). Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1.

A request handler 130, e.g., included in the application server 112, can handle requests received from the client device 102. Specifically, the request handler 130 can process data requests or other requests generated by the client application 114 (or its components 118-120). In some implementations, the request handler 130 can also process requests received from other sources in addition to client devices 102, e.g., requests received from external systems 106. The request handler 130 can receive user input selecting a particular algorithm and electing corresponding parameters and other input, as described below.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens for selecting an algorithm and electing associated parameters. In particular, the GUI 140 may be used to view and navigate various web pages located both internally and externally to the server 104.

Figure 2:
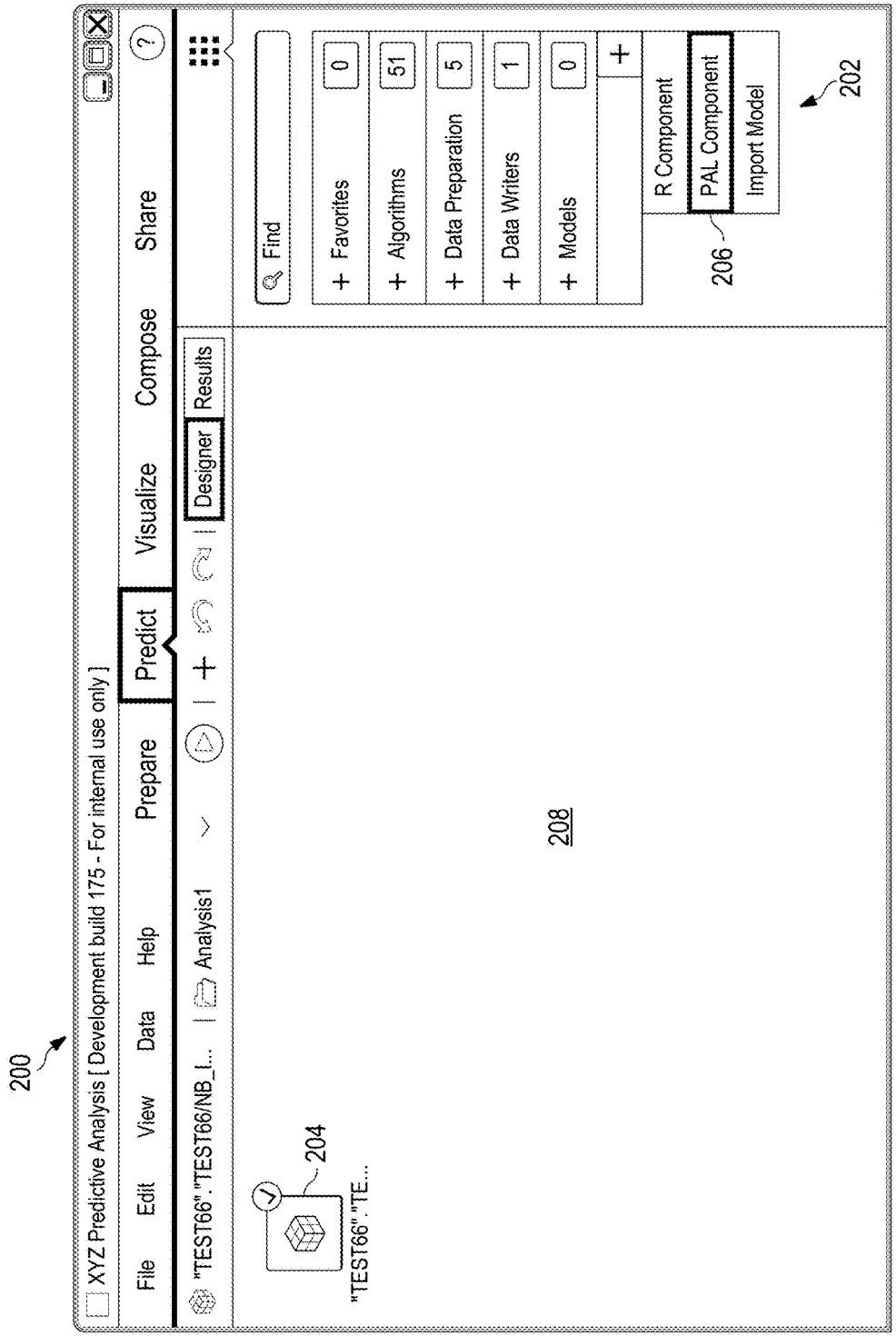
FIG. 2 is a diagram of an example user interface for using analytics analysis algorithms.

FIG. 2 is a diagram of an example user interface 200 for using predictive analytics algorithms. For example, the user interface 200 can be used in an automated approach for integrating AFL functions/algorithms in predictive analytics, as described above. The user interface 200 can present the Predictive Analytics Library (PAL) that includes a library of algorithms 202 that are candidates for use by the user in functions that operate on a data set 204. In this way, the user interface 200 can serve as a data scientist tool for creating complex models to solve data mining problems. For example, the library of algorithms 202 can allow the user to pick and choose the algorithms that the user may want to work with, without explicitly flooding the user with loads of algorithms up front which the user may never use.

Based on user selections in the user interface 200, relevant visualizations for the algorithms can be automatically surfaced, including algorithms that the user intends to get into the PA product, without the user explicitly creating them. For example, by selecting a control 206 for generating a specific component, the user can specify that a PAL component is to be added as a function that is operate on the data set 204. The data set 204, for example, can be presented in a canvas area 208, in which the user can build a train of functions to operate (e.g., sequentially) on the data set 204. Each function is executed using an executable component that is built from a user-selected and user-customized algorithm from the library of algorithms 202. The canvas area 208 can also serve as, or provide access to, a result window in which default visualizations are presented.

Figure 3:
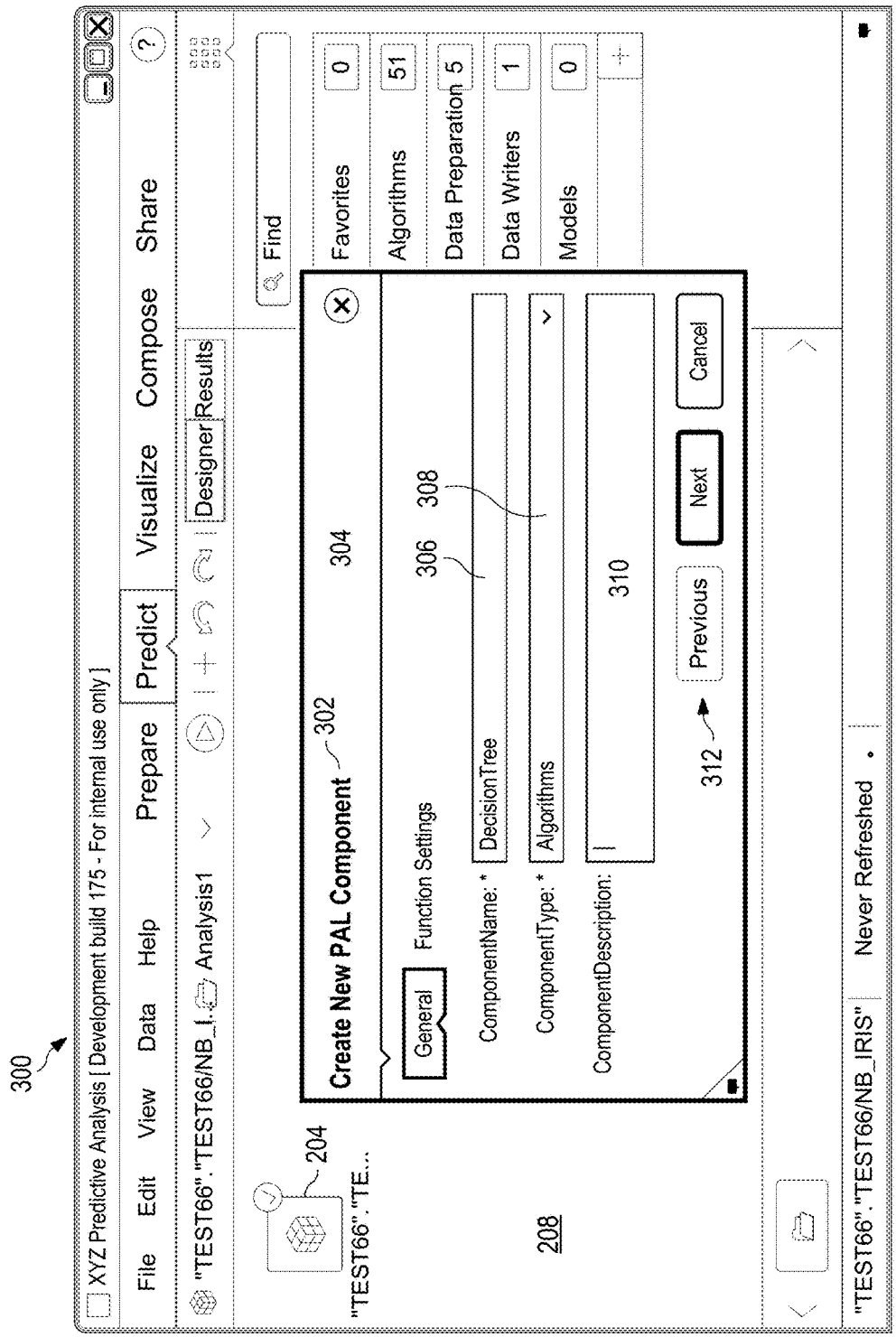
FIG. 3 is a diagram of an example component creation screen.

FIG. 3 is a diagram of an example component creation screen 300. For example, the component creation screen 300 can be presented to the user upon selection of the control 206 on the user interface 200. As such, a title 302 in a data entry area 304 identifies creation of a PAL component. For example, using the component creation screen 300, the user can create a function that is to be used in a PA product that is used in analyzing information in the data set 204.

Using a component name field 306, component creation screen 300 allows the user to provide a component name (e.g., DecisionTree) in a component name field 306 for a component that the user is trying to include in the product. In this example, the component has a component type 308 of "Algorithms." A component description field 310 permits the user to enter a description of the component. Once inputs are complete in the component creation screen 300, controls 312 can be used, e.g., to advance to a next screen.

Figure 4:
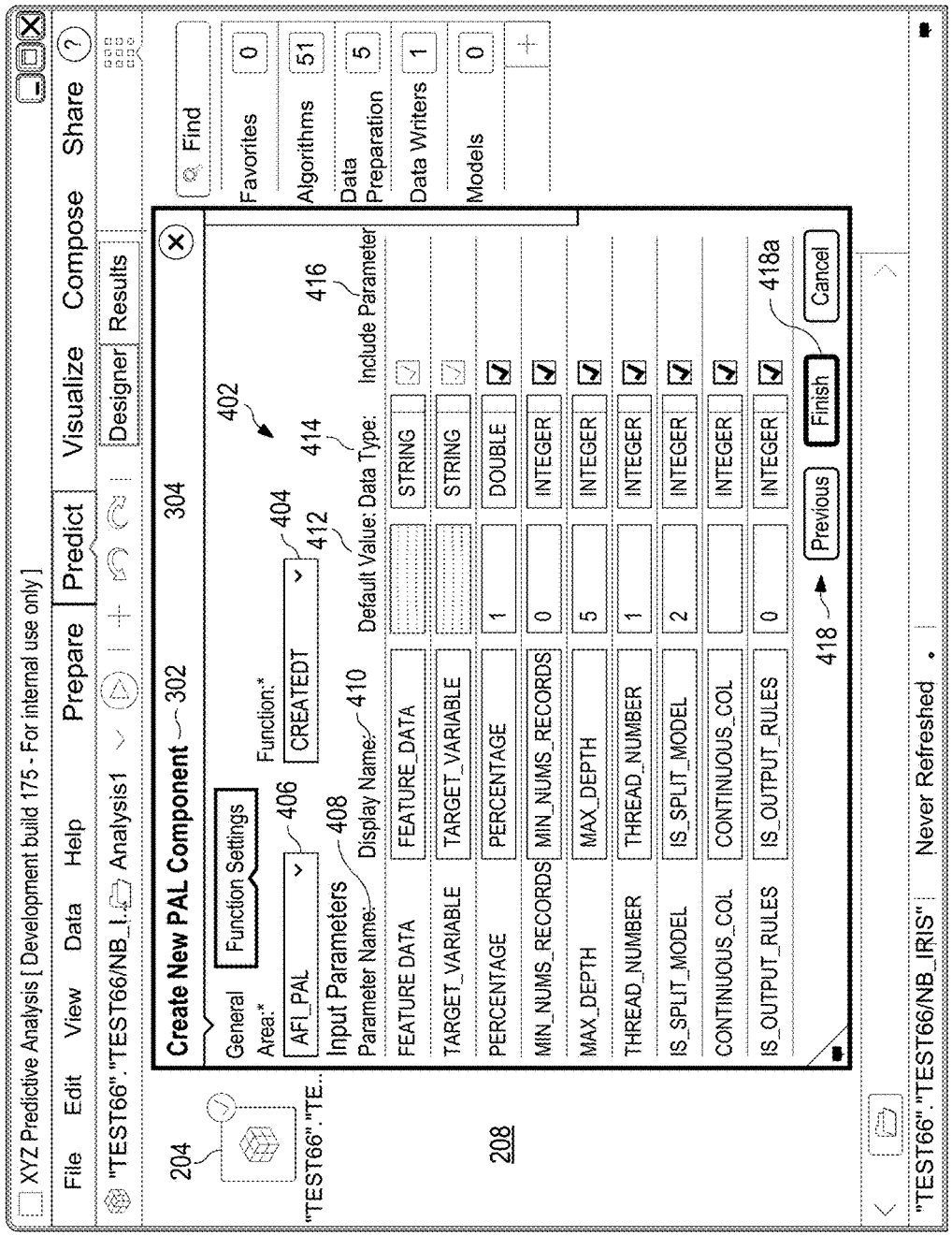
FIG. 4 is a diagram of an example component parameters screen.

FIG. 4 is a diagram of an example component parameters screen 400. For example, the component parameters screen 400 can be presented to the user upon selection of a Next control among the controls 312 on the component creation screen 300. The user can use the component parameters screen 400 to define parameters 402 that are to be used in the component that serves as the function that is operate on the data set 204. The parameters 402 are associated with a function 404 (e.g., CREATEDT) defined in a functional area 406 (e.g., "AFLPAL").

In some implementations, displaying the parameters 402 can include displaying, for each parameter a parameter display name 408 (e.g., that is the name of the parameter as used in the algorithm), a display name 410 (e.g., that can be the same name as the parameter display name 408 or a name that the user or someone else specifies), a default value 412, a data type 414, and an election control 416. The default value 412, for example, can be a default value that is set for the algorithm, e.g., as a suggested value for the parameter, however, the user can change the value. The data type 414, for example, can identify the data type (e.g., integer, non-integer, Boolean, string, or other type) of the associated parameter display name 408. The user can use each of the respective election controls 416 to elect to either include or exclude the associated parameter in the function. Upon completion of user inputs, controls 418 can be used to advance to the next screen (or to perform other functions). For example, upon selecting a finish control 418a from among the controls 418, a function based on the algorithm is automatically included into the PA Product.

Given an area and a function, the wizard will auto-populate the corresponding parameters. These parameters are then listed below with all configurable information, and split into training and scoring parameters. Each parameter has a parameter name (e.g., the name of the PAL parameter), a display name (e.g., an editable display name, defaulted to the PAL parameter name, camel-cased and spaced), a default value (e.g., editable, but initialized by the catalog), a type (e.g., specifying the PAL type that the value must be), and an include flag (e.g., a flag indicating whether the user elects to expose the parameter in their component). In some implementations, some user operations can be disabled or limited. For example, mandatory fields in an algorithm may be presented in a way that they cannot be un-selected by the user, values for input fields can be omitted when no defaults exist, or other variations can occur.

The editable fields can have validation attached to them. For example, in the case of the default values, they are type-checked against their PAL types. Any validation error will result in the finish control 418a being disabled.

Figure 5:
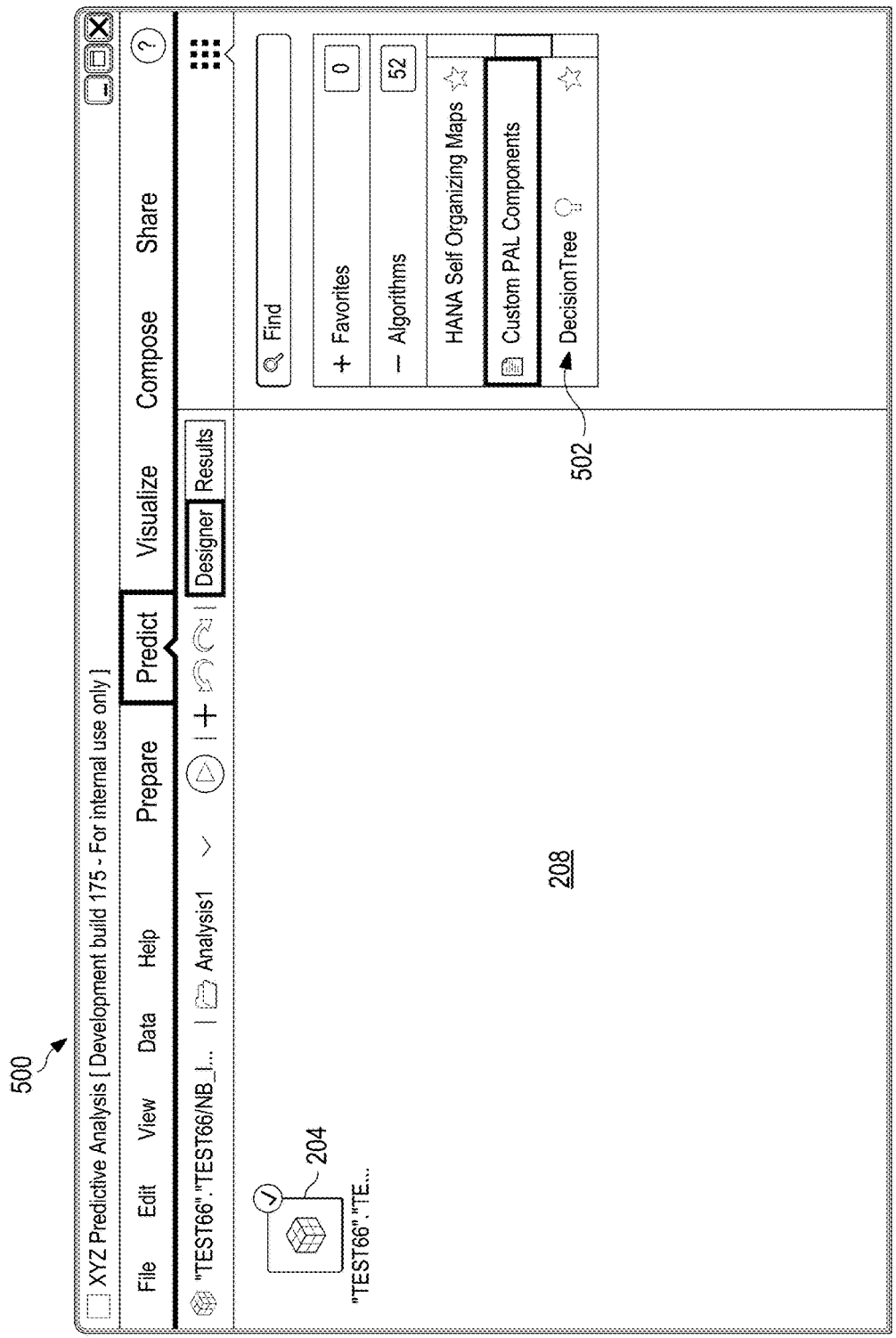
FIG. 5 is a screen shot of an example interface that shows a newly-created component.

FIG. 5 is a screen shot of an example interface 500 that shows a newly-created component 502. For example, the component 502 (e.g., "DecisionTree") can be annotated on the in interface 500, such as by including a green dot or some other marking adjacent to the component name. To the user, the marking can indicate, for example, that the component is included as part of the model for use in subsequent processing.

At this point, the component 502 has been created, which the complexity (e.g., underlying code, such as SQL statements) behind the component's creation is completely abstracted from the end user of the PA product. As such, a user-customized version of the algorithm exists and is dynamically associated with the PA product associated with the data set 204.

Figure 6:
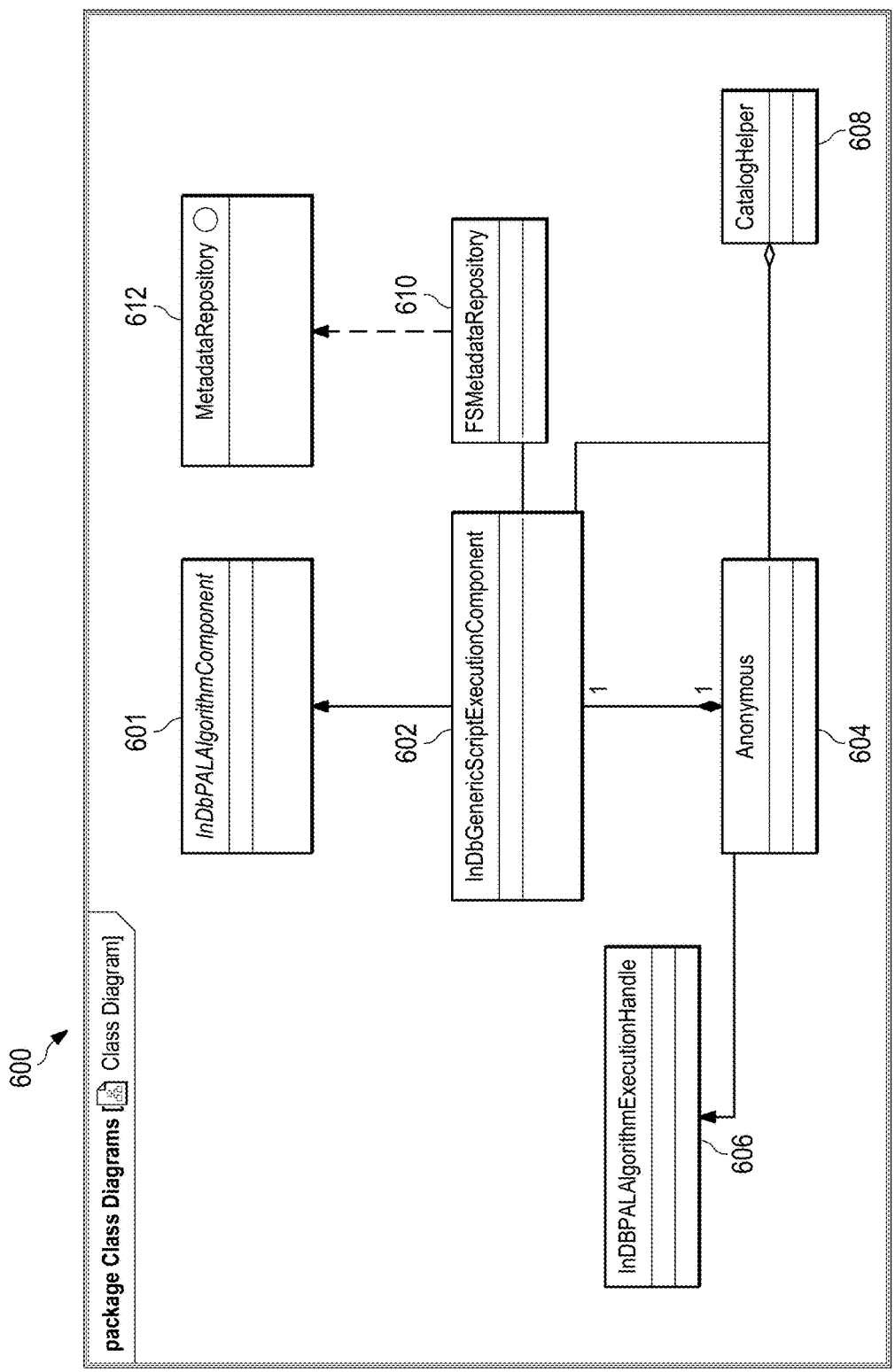
FIG. 6 is a diagram of an example high-level architecture of a predictive analytics wrapper.

FIG. 6 is a diagram of an example high-level architecture of a predictive analytics wrapper 600. For example, the predictive analytics wrapper 600 can be a package class that is used to implement the component 502.

In some implementations, the predictive analytics wrapper 600 includes an algorithm component node 601 that uses an execution component 602 (e.g., "InDbGenericScriptExecutionComponent") that serves as the central execution component for the wrapper. The execution component 602, for example, can belong to an anonymous class 604 that itself belongs to a execution handle class 606. Such classes, for example, can allow the execution component 602 to read from the PAL API catalog and build database artifacts required for training and scoring. The execution component 602 is responsible for saving the model that might be generated during the train and persisted by the user for scoring. The train, in this sense, is a sequence of functions that are executed, e.g., functions in s spreadsheet that depend on other values in the spreadsheet.

In some implementations, the predictive analytics wrapper 600 includes a catalog helper class 608 (e.g., named "CatalogHelper"). The catalog helper class 608, for example, can enable reading from a local catalog.xml which has definition of each of the PAL APIs, e.g., in terms of what is needed by the PA for training, scoring and summary information. In some implementations, the catalog helper class 608 can also have information required for visualizations that have to be built on top of the results of a given PAL's APIs.

A metadata repository class 610 (e.g., "FSMetadataRepository") can be responsible for enabling the node to be persisted in the local file system or any other repository that the platform provides. The class can be used to persist the script metadata into the file system based on the vendor name. The metadata repository class 610 can use information from a metadata repository 612.

The anonymous class 604 can be responsible for execution. For example, the class can support building procedures and other artifacts when the component is executed.

The catalog helper class 608 can be used, for example, for parsing the catalog.xml. In some implementations, the catalog helper class 608 can be used to access the service.

Figure 7:
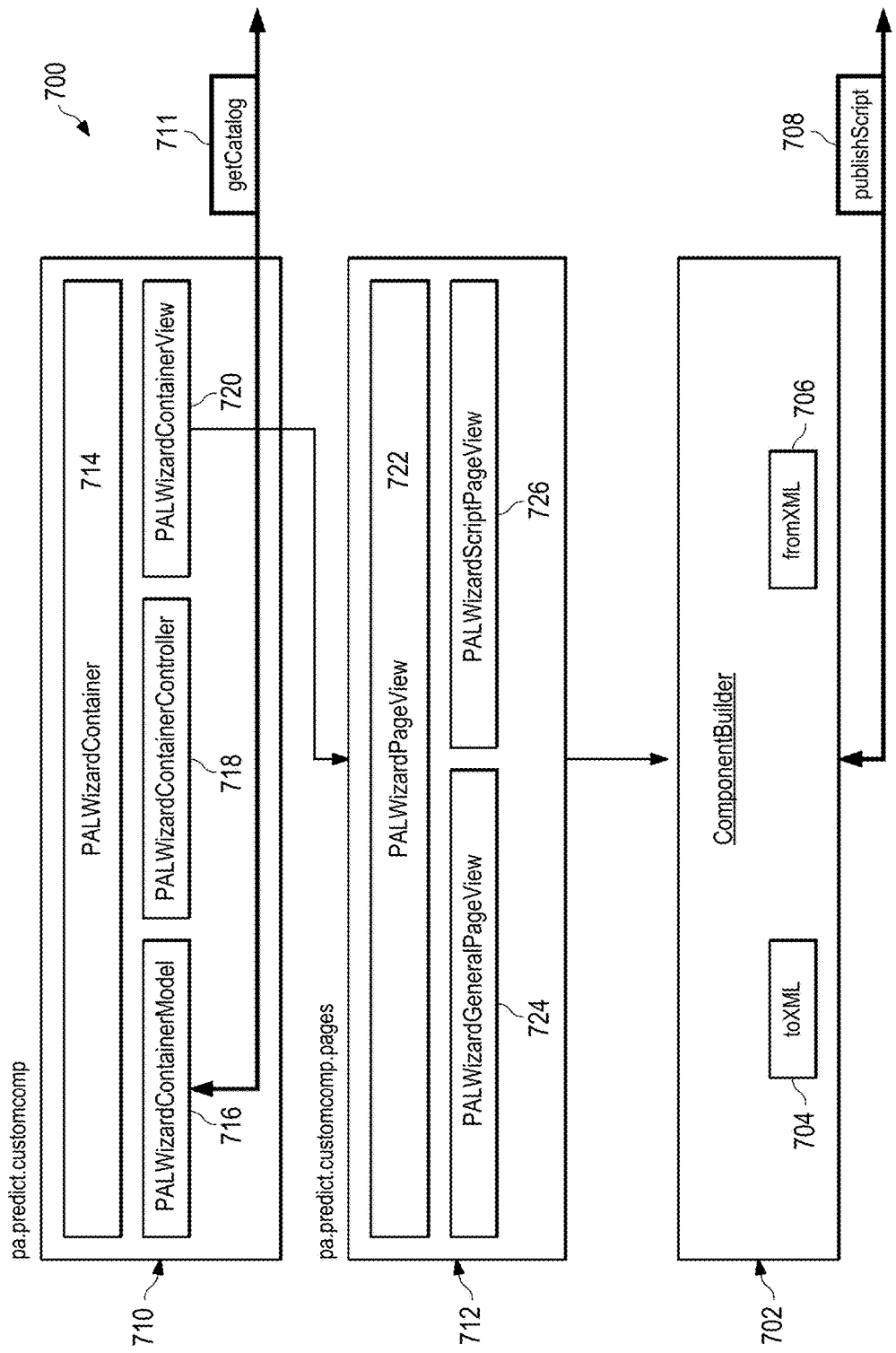
FIG. 7 is a diagram of an example hierarchy of component builder wizards.

FIG. 7 is a diagram of an example hierarchy 700 of component builder wizards. For example, the hierarchy 700 illustrates actions that occur among components of the hierarchy 700 once the user clicks the finish control 418a. At this time, the callback will enter a component builder 702 which is responsible for creating the component XML. Creation of the component XML is performed by a toXML function 704. This creates a component XML, enabling reuse of the existing publish script request. The toXML function 704 essentially just converts the model into an XML format containing the function's metadata and script parameters. Once this function returns the component XML, the component XML is then wrapped in the request XML and sent through the service.

The component builder 702 also contains a fromXML function 706, which contains the code to parse PAL components. The fromXML function 706, for example, can convert component XML to model data, e.g., convert the component XML back into the JSON model format to initialize the PAL WizardContainerModel when the component is being edited. The component builder 702 also publishes the component, e.g., using a publish script 708.

The hierarchy 700 includes a custom component 710 and a custom page component 712. In some implementations, the custom component 710 issues a getCatalog request 711 and includes a wizard container component 714, a wizard container model component 716, a wizard container controller component 718, a wizard container view component 720. In some implementations, the custom page component 712 includes a wizard page view component 722, a wizard general page view component 724, and a wizard script page view component 726.

Figure 8:
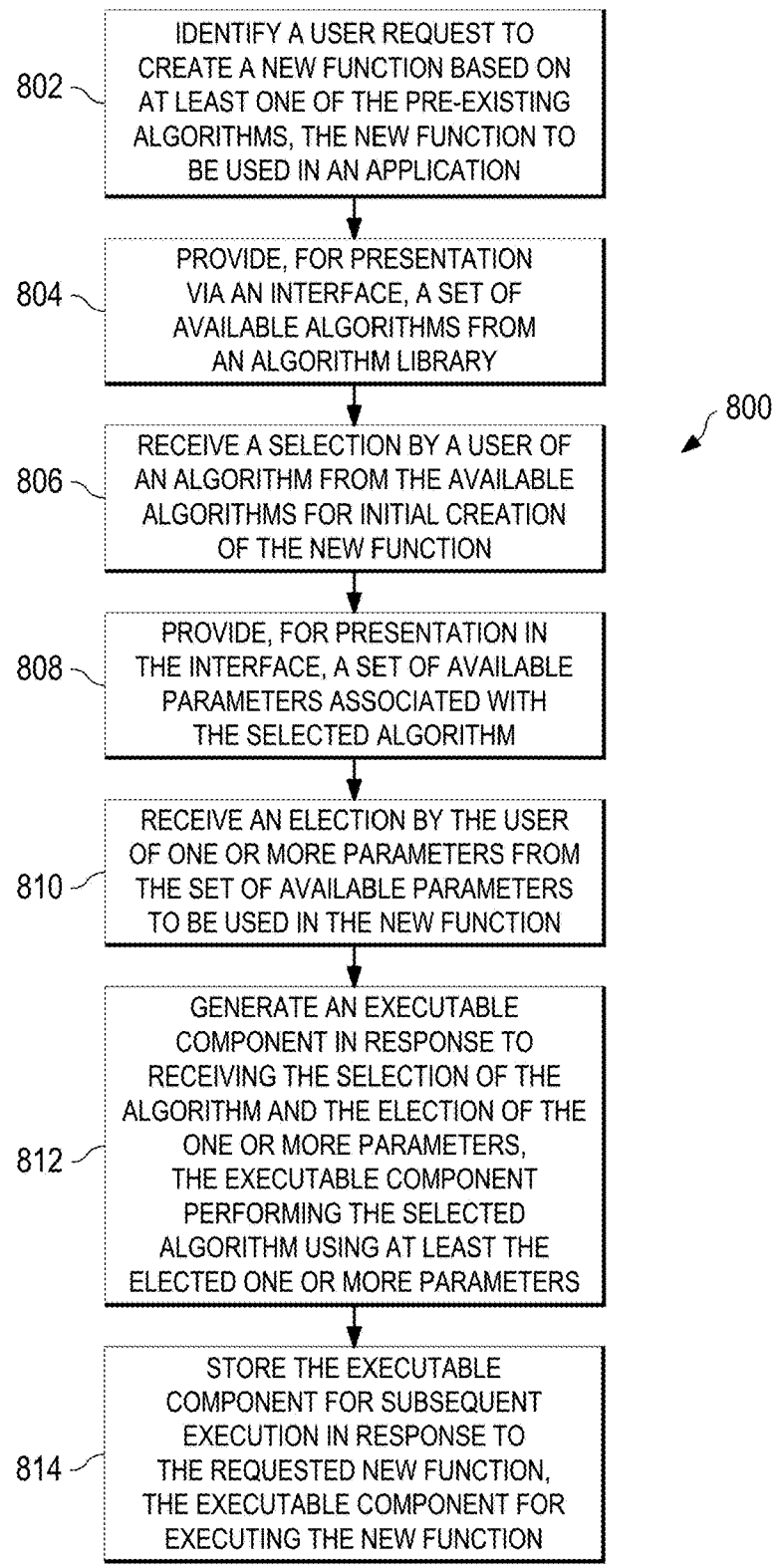
FIG. 8 is a flowchart of an example method for generating an executable component for a user-customized function.

FIG. 8 is a flowchart of an example method 800 for generating an executable component for a user-customized function. For clarity of presentation, the description that follows generally describes method 800 in the context of FIGS. 1-7. However, it will be understood that the method 800 may be performed, for example, by any other suitable system, environment, software, and hardware, or a combination of systems, environments, software, and hardware as appropriate. For example, the server 104 and/or its components can be used to execute the method 800. Actual presentation of information to the user and inputs received from the user can be handled by the client device 102.

At 802, a user request is identified to create a new function based on at least one of pre-existing algorithms, the new function to be used in an application. For example, the identified user request, e.g., identified by the user request module 116, can be a user selection of the control 206 that indicates that the user is specifying that a PAL component is to be added as a function that is operate on the data set 204.

In some implementations, the pre-existing algorithms provide predictive analytical analysis. For example, the function that is to be added can be a predictive analytics function that is to be based on one of the algorithms from the algorithm library 110.

At 804, a set of available algorithms from an algorithm library is provided for presentation via an interface. As an example, in response to the user selection of the control 206, the algorithm module 122 can identify available algorithms from the algorithm library 110. Identifying the algorithms may include the use of constraints, such as limiting the algorithms to those algorithms that are applicable to the user and/or compatible with the data set 204, algorithms previously used by the user, or other selection criteria. The server 104 can provide the algorithms to the client device 102, e.g., for user selection of a particular algorithm.

In some implementations, the algorithm library is a centralized library. For example, although the algorithm library 110 is shown in FIG. 1 as a component of the server 104, part or all of the algorithm library 110 can be resident elsewhere, such as at external systems 106.

At 806, a selection of an algorithm from the available algorithms is received for initial creation of the new function. For example, the user can identify potential algorithms for use by using the component type 308 to list available algorithms and/or the component name field 306 to type in the name of a specific algorithm. Other ways of identifying an algorithm can be used.

At 808, a set of available parameters associated with the selected algorithm is provided for presentation in the interface. As an example, as shown in FIG. 4, parameters 402 are displayed, each displayed parameter including the corresponding parameter display name 408, display name 410, default value 412, data type 414, and election control 416.

In some implementations, each algorithm is defined by one or more structured query language (SQL) statements, wherein the SQL statements are hidden from the user, and wherein the executable component includes SQL statements. For example, the parameters associated with the user-selected algorithm can correspond to available SQL statements associated with the algorithm.

At 810, an election is received of one or more parameters from the set of available parameters to be used in the new function. For example, the user can use each of the respective election controls 416 to elect to either include or exclude the associated parameter in the function.

In some implementations, for a particular parameter that is elected, the method 800 includes additional actions. Parameter attributes associated with the parameter are provided for display to the user, the parameter attributes including a default value and a data type for the parameter. For example, for any given optional parameter 402 that is presented to the user, e.g., in the component parameters screen 400, the user can use the corresponding election control 416 to include or exclude the parameter in the function being created. A value override is received from the user that replaces the default value, and the value override is included in the generated executable component prior to the storing. As an example, the user has the option of changing the parameter display name 408 and/or the default value 412.

At 812, an executable component is generated in response to receiving the selection of the algorithm and the election of the one or more parameters, the executable component performing the selected algorithm using at least the elected one or more parameters. As an example, the executable component module 124 can generate an executable component that is based on the algorithm selected by the user and the parameters elected by the user.

In some implementations, the executable component is compatible with the application and a data set upon which the application operates. For example, the executable component that is generated can be compatible with the user's selection of the data set 204.

In some implementations, the executable component comprises a reusable stored procedure. For example, the executable component can be a stored SQL script or some other stored procedure or executable script.

In some implementations, each algorithm is associated with a training algorithm, and generating the executable component includes identifying a scoring algorithm associated with the training algorithm and associating the identified scoring algorithm to the executable component. For example, a training algorithm can be used to fine-tune and make adjustments to an existing algorithm. The adjustments can include, for example, adjustments to specific parameters in the algorithm to use, including their default values. The training can also determine sensitivities in an algorithm, e.g., to include information as to how changes in a specific parameter may be propagated and/or multiplied in an algorithm. Scoring algorithm can be used to score existing algorithms. The scoring can include, for example, an indication as to how accurately the algorithm is predicting a particular value (e.g., profit, loss, or other indicator).

In some implementations, generating the executable component includes using a template. For example, the template includes (or instructions to generate) code for all available parameters associated with the selected algorithm. Generating the executable component includes including code for parameters and values elected by the user, and excluding code for parameters not elected by the user.

At 814, the executable component is stored for subsequent execution in response to the requested new function, the executable component for executing the new function. For example, the executable component generated by the executable component module 124 can be a stored SQL procedure or script. Other structures for storing and executing executable components are possible.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
    identifying a user request to create a new function based on at least one of pre-existing algorithms, the new function to be used in an application used by a user;
    providing, in a first presentation via a user interface, a set of available algorithms from an algorithm library;
    receiving, via the user interface, a user selection of an algorithm from the set of available algorithms for initial creation of the new function, the algorithm including a set of available parameters, wherein each parameter of the set of available parameters is user-selectable for inclusion into or exclusion from the new function based on the user selection of the algorithm;
    providing, in a second presentation via the user interface, the set of available parameters;
    receiving, via the user interface for each parameter of the set of available parameters, a user election of whether to include or exclude the parameter for use in the new function;
    generating, using a package class of a package of nodes implementing executable components parameterized by users using the user interface, an executable component in response to receiving the user selection of the algorithm and the user election of whether to include or exclude each parameter for use, the executable component defined in an execution component node in the package and serving as a central execution component for the new function, the package including a metadata node corresponding to the execution component node and enabling the execution component node to be persisted in a local tile system or a repository provided by a platform hosting the application, the executable component configured to execute the new function, including:
        for a given parameter that the user has elected to include in the new function, the executable component including the parameter in the new function; and
        for a given parameter that the user has elected for exclude from the new function, the executable component excluding the parameter from the new function; and
    storing the executable component for subsequent execution in response to the requested new function, the executable component for executing the new function.

2. The method of claim 1, further comprising, for a particular parameter that is elected:
    providing, for display to the user, parameter attributes associated with the parameter, the parameter attributes including a default value and a data type for the parameter;
    receiving a value override by the user that replaces the default value; and
    including the value override in the generated executable component prior to the storing.

3. The method of claim 1, wherein generating the executable component includes:
    using a template that includes code for all available parameters associated with the user-selected algorithm;
    including code for parameters and values elected by the user; and
    excluding code for parameters not elected by the user.

4. The method of claim 1, wherein each algorithm is defined by one or more structured query language (SQL) statements, wherein the SQL statements are hidden from the user, and wherein the executable component includes SQL statements.

5. The method of claim 1, wherein the executable component is compatible with the application and a data set upon which the application operates.

6. The method of claim 1, wherein the executable component comprises a reusable stored procedure.

7. The method of claim 1, wherein the set of available algorithms provide predictive analytical analysis.

8. The method of claim 1, wherein the algorithm library is a centralized library.

9. The method of claim 1, wherein each algorithm is associated with a training algorithm, and wherein generating the executable component includes:
identifying a scoring algorithm associated with the training algorithm; and
associating the identified scoring algorithm to the executable component.

10. A system comprising:
memory storing:
an algorithm library defining available algorithms and associated parameters; and
an executable component library comprising executable components, each executable component a user-customized algorithm from the algorithm library;
an application providing operations comprising:
identifying a user request to create a new function based on at least one of pre-existing algorithms, the new function to be used in an application used by a user;
providing, in a first presentation via a user interface, a set of available algorithms from an algorithm library;
receiving, via the user interface, a user selection of an algorithm from the set of available algorithms for initial creation of the new function, the algorithm including a set of available parameters, wherein each parameter of the set of available parameters is user-selectable for inclusion into or exclusion from the new function based on the user selection of the algorithm;
providing, in a second presentation via the user interface, the set of available parameters;
receiving, via the user interface for each parameter of the set of available parameters, a user election of whether to include or exclude the parameter for use in the new function;
generating, using a package class of a package of nodes implementing executable components parameterized by users using the user interface, an executable component in response to receiving the user selection of the algorithm and the user election of whether to include or exclude each parameter for use, the executable component defined in an execution component node in the package and serving as a central execution component for the new function, the package including a metadata node corresponding to the execution component node and enabling the execution component node to be persisted in a local file system or a repository provided by a platform hosting the application, the executable component configured to execute the new function, including:
for a given parameter that the user has elected to include in the new function, the executable component including the parameter in the new function; and
for a given parameter that the user has elected for exclude from the new function, the executable component excluding the parameter from the new function; and
storing the executable component for subsequent execution in response to the requested new function, the executable component for executing the new function; and
an analytical processor for performing steps of the application.

11. The system of claim 10, the operations further comprising, for a particular parameter that is elected:
providing, for display to the user, parameter attributes associated with the parameter, the parameter attributes including a default value and a data type for the parameter;
receiving a value override by the user that replaces the default value; and
including the value override in the generated executable component prior to the storing.

12. The system of claim 10, wherein generating the executable component includes:
using a template that includes code for all available parameters associated with the user-selected algorithm;
including code for parameters and values elected by the user; and
excluding code for parameters not elected by the user.

13. The system of claim 10, wherein each algorithm is defined by one or more structured query language (SQL) statements, wherein the SQL statements are hidden from the user, and wherein the executable component includes SQL statements.

14. The system of claim 10, wherein the executable component is compatible with the application and a data set upon which the application operates.

15. The system of claim 10, wherein the executable component comprises a reusable stored procedure.

16. A non-transitory computer-readable media encoded with a computer program, the computer program comprising instructions that when executed by one or more computers cause the one or more computers to perform operations comprising:
identifying a user request to create a new function based on at least one of pre-existing algorithms, the new function to be used in an application used by a user;
providing, in a first presentation via a user interface, a set of available algorithms from an algorithm library;
receiving, via the user interface, a user selection of an algorithm from the set of available algorithms for initial creation of the new function, the algorithm including a set of available parameters, wherein each parameter of the set of available parameters is user-selectable for inclusion into or exclusion from the new function based on the user selection of the algorithm;
providing, in a second presentation via the user interface, the set of available parameters;
receiving, via the user interface for each parameter of the set of available parameters, a user election of whether to include or exclude the parameter for use in the new function;
generating, using a package class of a package of nodes implementing executable components parameterized by users using the user interface, an executable component in response to receiving the user selection of the algorithm and the user election of whether to include or exclude each parameter for use, the executable component defined in an execution component node in the package and serving as a central execution component for the new function, the package including a metadata node corresponding to the execution component node and enabling the execution component node to be persisted in a local file system or a repository provided by a platform hosting the application, the executable component configured to execute the new function, including:
for a given parameter that the user has elected to include in the new function, the executable component including the parameter in the new function; and for a given parameter that the user has elected for exclude from the new function, the executable component excluding the parameter from the new function; and storing the executable component for subsequent execution in response to the requested new function, the executable component for executing the new function.

17. The non-transitory computer-readable media of claim 16, the operations further comprising, for a particular parameter that is elected:

providing, for display to the user, parameter attributes associated with the parameter, the parameter attributes including a default value and a data type for the parameter;

receiving a value override by the user that replaces the default value; and including the value override in the generated executable component prior to the storing.

18. The non-transitory computer-readable media of claim 16, wherein generating the executable component includes:

using a template that includes code for all available parameters associated with the user-selected algorithm;

including code for parameters and values elected by the user; and excluding code for parameters not elected by the user.

19. The non-transitory computer-readable media of claim 16, wherein each algorithm is defined by one or more structured query language (SQL) statements, wherein the SQL statements are hidden from the user, and wherein the executable component includes SQL statements.

20. The non-transitory computer-readable media of claim 16, wherein the executable component is compatible with the application and a data set upon which the application operates.

* * * * *